(12) United States Patent
Pawale et al.

(10) Patent No.: US 11,946,438 B2
(45) Date of Patent: Apr. 2, 2024

(54) PILOT VALVE FOR PRESSURE RELIEF VALVE

(71) Applicant: Eaton Intelligent Power Limited, Dublin (IE)

(72) Inventors: Harshad Pawale, Pune (IN); Pradeep Biradar, Pune (IN); Abhijit Borawake, Pune (IN)

(73) Assignee: Eaton Intelligent Power Limited, Dublin (IE)

( * ) Notice: Subject to any disclaimer, the term of this patent is extended or adjusted under 35 U.S.C. 154(b) by 181 days.

(21) Appl. No.: 17/206,723

(22) Filed: Mar. 19, 2021

(65) Prior Publication Data

US 2021/0293212 A1  Sep. 23, 2021

(30) Foreign Application Priority Data

Mar. 20, 2020  (IN) .............................. 202011012023

(51) Int. Cl.
*F16K 17/04* (2006.01)
*B64D 37/32* (2006.01)
(Continued)

(52) U.S. Cl.
CPC ......... *F02M 37/0029* (2013.01); *B64D 37/32* (2013.01); *F16K 17/048* (2013.01);
(Continued)

(58) Field of Classification Search
CPC ............. Y10T 137/7779; F16K 17/196; F16K 17/048; F16K 17/10; F16K 17/30;
(Continued)

(56) References Cited

U.S. PATENT DOCUMENTS

| | | | | |
|---|---|---|---|---|
| 848,641 A | * | 4/1907 | Dudgeon | .................. F16K 3/08 |
| | | | | 137/493.8 |
| 1,669,739 A | * | 5/1928 | Clark | .................... F16K 17/194 |
| | | | | 137/493.8 |

(Continued)

FOREIGN PATENT DOCUMENTS

EP  0494557  * 12/1991
FR  2334143 A1  7/1977

OTHER PUBLICATIONS

Machine Translation of EP0494557 retrieved from espacenet.com on Sep. 12, 2023. (Year: 2023).*

(Continued)

*Primary Examiner* — Jessica Cahill
(74) *Attorney, Agent, or Firm* — Merchant & Gould P.C.

(57) ABSTRACT

A pilot valve assembly, for operating a pressure reducing valve disposed within a fuel tank, can include a housing including a first chamber and a second chamber, a first port in fluid communication with the first and second chambers, the first port being configured to receive an atmospheric pressure, a second port in fluid communication with the first and second chambers, the second port being configured to receive a fuel tank pressure, a first pilot valve arranged within the first chamber and configured to open only when a predetermined positive pressure differential exists between the first and second ports, and a second pilot valve arranged within the second chamber and configured to open only when a predetermined negative pressure differential exists between the first and second ports.

19 Claims, 12 Drawing Sheets

(51) Int. Cl.
*F02M 37/00* (2006.01)
*F16K 17/10* (2006.01)
*F16K 17/196* (2006.01)
*F16K 17/30* (2006.01)
*F16K 31/126* (2006.01)
*F16K 41/10* (2006.01)

(52) U.S. Cl.
CPC ............ *F16K 17/10* (2013.01); *F16K 17/196* (2013.01); *F16K 17/30* (2013.01); *F16K 31/1262* (2013.01); *F16K 41/10* (2013.01)

(58) Field of Classification Search
CPC ...... F16K 31/1262; F16K 41/10; F16K 17/18; F16K 17/19; F02M 37/0029; B64D 37/32
See application file for complete search history.

(56) References Cited

U.S. PATENT DOCUMENTS

| | | | | |
|---|---|---|---|---|
| 2,351,874 A | * | 6/1944 | Parker | F16K 17/196 137/542 |
| 2,377,132 A | * | 5/1945 | Crowe | F16K 17/00 137/519 |
| 3,792,713 A | * | 2/1974 | Zadoo | F16K 1/126 137/220 |
| 3,826,277 A | * | 7/1974 | Bois | F16K 17/196 137/71 |
| 5,183,074 A | * | 2/1993 | Reese | G05D 16/163 137/488 |
| 5,477,829 A | * | 12/1995 | Hassinger | F02M 69/462 137/493.8 |
| 9,058,042 B2 | * | 6/2015 | Vu | F16K 17/196 |
| 2014/0261782 A1 | * | 9/2014 | Vu | F16K 31/56 137/469 |

OTHER PUBLICATIONS

Preliminary Search Report and Written Opinion for FR2102769, dated Jul. 12, 2022.

* cited by examiner

PILOT VALVE FOR PRESSURE RELIEF VALVE

RELATED APPLICATION

This application claims priority to India Patent Application Number 202011012023, filed on Mar. 20, 2020 and entitled PILOT VALVE FOR PRESSURE RELIEF VALVE, the entirety of which is incorporated by reference herein.

BACKGROUND

Pilot type relief valves for with aircraft fuel tanks are known. Such valves are generally utilized to maintain a pressure balance in the fuel tanks with respect to atmospheric pressure. Typical prior art pilot valves used in such applications are inherently complex as a pilot valve used for positive pressure cracking is physically housed within a pilot valve used for negative pressure cracking. Such a construction makes assembly difficult. Also, with such a construction, a spring for the negative cracking pilot valve has to work against the masses of both the positive and negative cracking pilot valves, which can cause the valve to incorrectly open under acceleration and vibration loads. Also, pilot valves of this type have the tendency to immediately close when the pressure differential across them drops below the cracking pressure. This prevents the formation of a pressure differential across a diaphragm of the PRV as the orifice present in the diaphragm will instantaneously equalize any change in pressure between an upper diaphragm chamber and the tank, thereby preventing the latch mechanism from releasing and opening the main poppet. Improvements are desired.

SUMMARY

A two-stage pilot type relief valve (PRV) is disclosed. In one application, the PRV can be positioned in the surge tank of an aircraft and operated to maintain the pressure balance in aircraft fuel tanks (surge tank) with respect to atmospheric pressure. If a wing tank is over pressurized with respect to the atmosphere, the PRV can open to release the excess pressure in the wing tanks by venting the fuel/air out to the atmosphere (positive cracking). If the wing tanks are under pressurized, the PRV can open to allow the atmospheric air into the wing tanks to equalize pressure (negative cracking).

In one aspect, the pilot valves of the PRV is designed to meet multiple criteria. For example, the disclosed pilot valves ensure cracking at the correct cracking pressure. After cracking, the opened pilot valve then remains open for some time in order to ensure that a substantial pressure differential can be built between an upper diaphragm chamber of the PRV and the tank, thereby ensuring that the diaphragm (i.e. the 2nd stage in a two-stage PRV) can lift and release the latch mechanism to allow the main poppet to open. The disclosed pilot valves is also resistant to opening unnecessarily under acceleration and vibration loads. The disclosed pilot valves are also easy to assemble.

A pilot valve assembly, for operating a pressure reducing valve disposed within a fuel tank, can include a housing including a first chamber and a second chamber, a first port in fluid communication with the first and second chambers, the first port being configured to receive an atmospheric pressure, a second port in fluid communication with the first and second chambers, the second port being configured to receive a fuel tank pressure, a first pilot valve arranged within the first chamber and configured to open only when a predetermined positive pressure differential exists between the first and second ports, and a second pilot valve arranged within the second chamber and configured to open only when a predetermined negative pressure differential exists between the first and second ports.

In some examples, the first pilot valve and the second pilot valve are each spring biased towards the closed position.

In some examples, the first pilot valve and the second pilot valve are each provided with a head portion supporting a seal member and are provided with a spring biasing the seal member against a portion of the housing.

In some examples, the first and second pilot valves are oriented in a side-by-side arrangement.

In some examples, the pilot valve housing is integrally formed with a housing of the pressure relief valve.

In some examples, the pilot valve housing is integrally formed with a cover portion of the pressure relief valve.

In some examples, the first pilot valve moves from a closed position to the open position in a first axial direction and wherein the second pilot valve moves from a closed position to the open position in a second axial direction opposite the first axial direction.

A valve assembly can include a pressure relief valve including a poppet operated by a diaphragm, the diaphragm defining an upper diaphragm chamber and a lower diaphragm chamber within a housing of the pressure relief valve, a pilot valve assembly in fluid communication with the upper diaphragm chamber and atmospheric pressure. The pilot valve can include a first pilot valve arranged to open only when a predetermined positive pressure differential exists between the upper diaphragm chamber and an atmospheric pressure and can include a second pilot valve, separate from the first pilot valve, arranged to open only when a predetermined negative pressure differential exists between the upper diaphragm chamber and atmospheric pressure.

In some examples, the first pilot valve and the second pilot valve are each spring biased towards the closed position.

In some examples, the first pilot valve and the second pilot valve are each provided with a head portion supporting a seal member and are provided with a spring biasing the seal member against a portion of the housing.

In some examples, the first and second pilot valves are oriented in a side-by-side arrangement.

In some examples, the first and second pilot valve are disposed in a pilot valve housing.

In some examples, the pilot valve housing is integrally formed with a housing of the pressure relief valve.

In some examples, the pilot valve housing is integrally formed with a cover portion of the pressure relief valve.

In some examples, the first pilot valve moves from a closed position to the open position in a first axial direction and wherein the second pilot valve moves from a closed position to the open position in a second axial direction opposite the first axial direction.

In some examples, the diaphragm includes an orifice extending between the upper and lower diaphragm chambers.

A valve assembly can include a pressure relief valve including a poppet operated by a diaphragm, the diaphragm defining an upper diaphragm chamber and a lower diaphragm chamber within a housing of the pressure relief valve, an orifice extending between the upper and lower diaphragm chambers, a pilot valve assembly in fluid communication with the upper diaphragm chamber and atmospheric pressure, the pilot valve including a first pilot valve arranged to open only when a predetermined pressure differential exists between the upper diaphragm chamber and an atmospheric pressure, wherein when in the open position, the pilot valve assembly blocks the orifice.

In some examples, the predetermine pressure differential is a positive pressure differential.

In some examples, the first pilot valve and the second pilot valve are each provided with a head portion supporting a seal member and are provided with a spring biasing the seal member against a portion of the housing.

In some examples, the first pilot valve is spring biased towards a closed position.

In some examples, the pilot valve assembly includes a plug portion connected to the first pilot valve and wherein the plug portion blocks the orifice when the first pilot valve is in the open position.

In some examples, the valve assembly further includes a second pilot valve arranged to open only when a predetermined negative pressure differential exists between the upper diaphragm chamber and atmospheric pressure.

In some examples, the first and second pilot valves are oriented in a side-by-side arrangement, wherein the first pilot valve moves from a closed position to the open position in a first axial direction and wherein the second pilot valve moves from a closed position to the open position in a second axial direction opposite the first axial direction.

A variety of additional aspects will be set forth in the description that follows. The aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
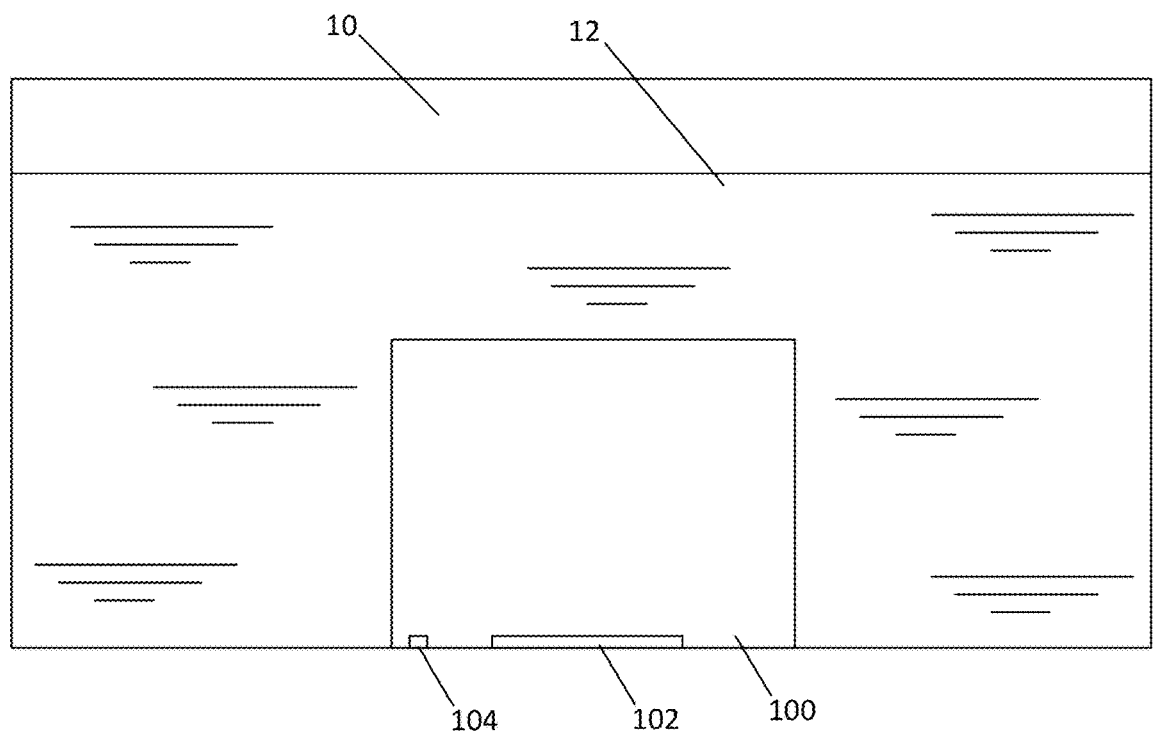
FIG. 1 is a schematic representation of a relief valve having features in accordance with the present disclosure that is installed within a fuel tank.

Various examples will be described in detail with reference to the drawings, wherein like reference numerals represent like parts and assemblies throughout the several views. Reference to various examples does not limit the scope of the claims attached hereto. Additionally, any examples set forth in this specification are not intended to be limiting and merely set forth some of the many possible examples for the appended claims. Referring to the drawings wherein like reference numbers correspond to like or similar components throughout the several figures.

Referring to FIG. 1, a general schematic is presented showing a fuel tank 10 storing liquid fuel 12. In one example, the fuel tank 10 is associated with an aircraft and the liquid fuel 12 is used for the engines of the aircraft. A pressure relief valve (PRV) 100 is shown disposed within the interior volume of the fuel tank 10 such that the PRV 100 is exposed to the internal pressure within the tank 10. As depicted, the PRV 100 is fully submerged by the fuel 12 in the tank 10. However, as fuel levels or other conditions change, it may be that the PRV 100 is not fully submerged at all times. In one aspect, the PRV 100 includes a valve 102 that opens to the exterior of the fuel tank 10 in order to equalize the internal pressure within the tank with the atmospheric pressure outside of the tank. As related above atmospheric conditions can change due to, for example, increases or decreases in elevation of the fuel tank 10 as is common in aircraft applications. To enable the PRV 100 to perform this function, the PRV 100 is additionally provided with a port 104 for sensing atmospheric pressure. In generalized terms, when the internal tank pressure relative to the atmospheric pressure increases above a specified high limit threshold, the PRV 100 will open to allow fuel and/or air within the fuel tank 10 to discharge via the PRV 100 until the tank pressure equalizes with atmospheric conditions. Similarly, when the internal tank pressure relative to the atmospheric pressure decreases below a specified low limit threshold, the PRV will open to allow atmospheric air to enter the fuel tank 10 via the PRV 100 until the tank pressure equalizes with atmospheric conditions.

In one aspect, the PRV 100 includes two pilot valves 210a, 210b, as described further below, one for positive cracking and one for negative cracking. The two pilot valves 210a, 210b are housed in their individual housing bodies which reduces the manufacturing complexity of the parts and also simplifies the assembly process. In one aspect, the pilot valves 210a, 210b and associated components are exactly identical, thereby reducing the unique part count of the assembly. Moreover, unlike some prior art concepts where the spring for the negative cracking pilot valve has to work against the masses of both the positive and negative cracking pilot valves, in the disclosed concept, the masses of each pilot valve 210a, 210b will be acting on their respective springs. This reduces the mass acting on the spring and thus prevents erratic opening under acceleration and vibration loads.

Figure 2:
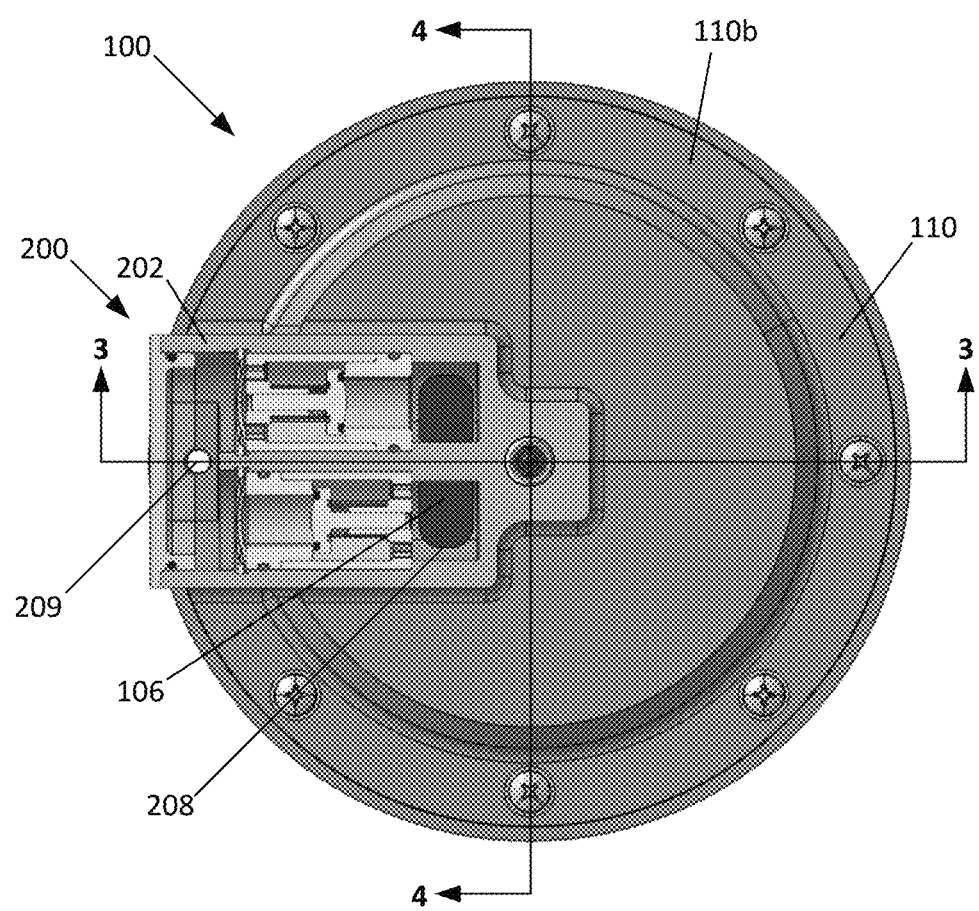
FIG. 2 is a top cross-sectional view of a first example of a pressure relief valve usable as the pressure relief valve shown in FIG. 1, the pressure relief valve including a pair of pilot valves.
Figure 3:
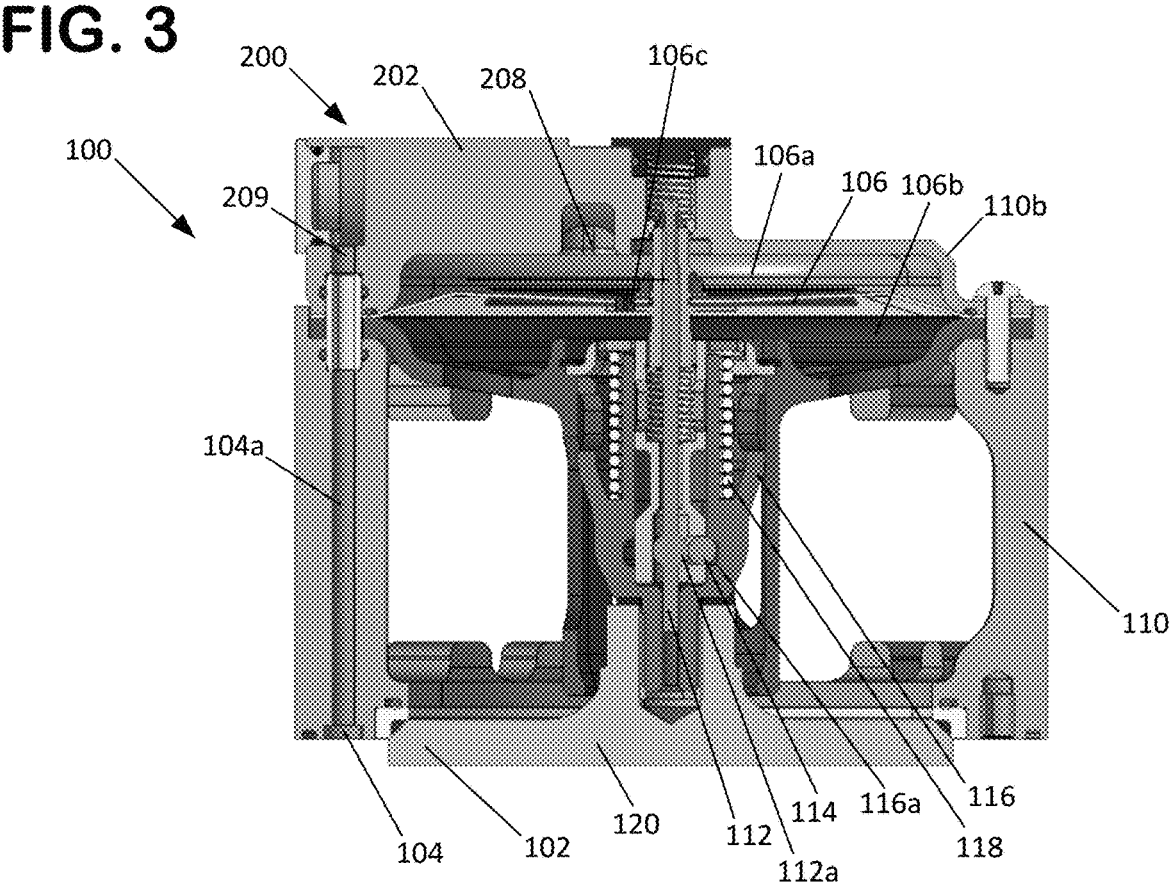
FIG. 3 is a cross-sectional view of the pressure relief valve shown in FIG. 2, taken along the line 3-3 in FIG. 2.
Figure 4:
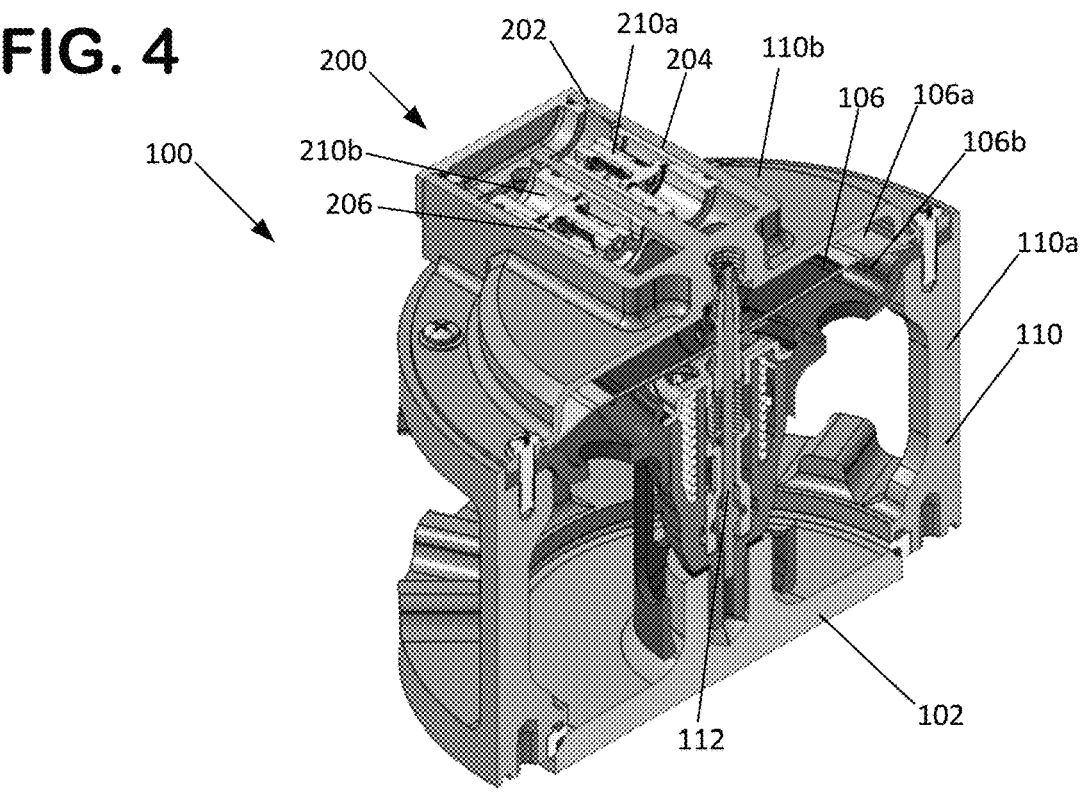
FIG. 4 is a perspective cross-sectional view of the pressure relief valve shown in FIG. 1, taken along the line 4-4 in FIG. 2.
Figure 5:
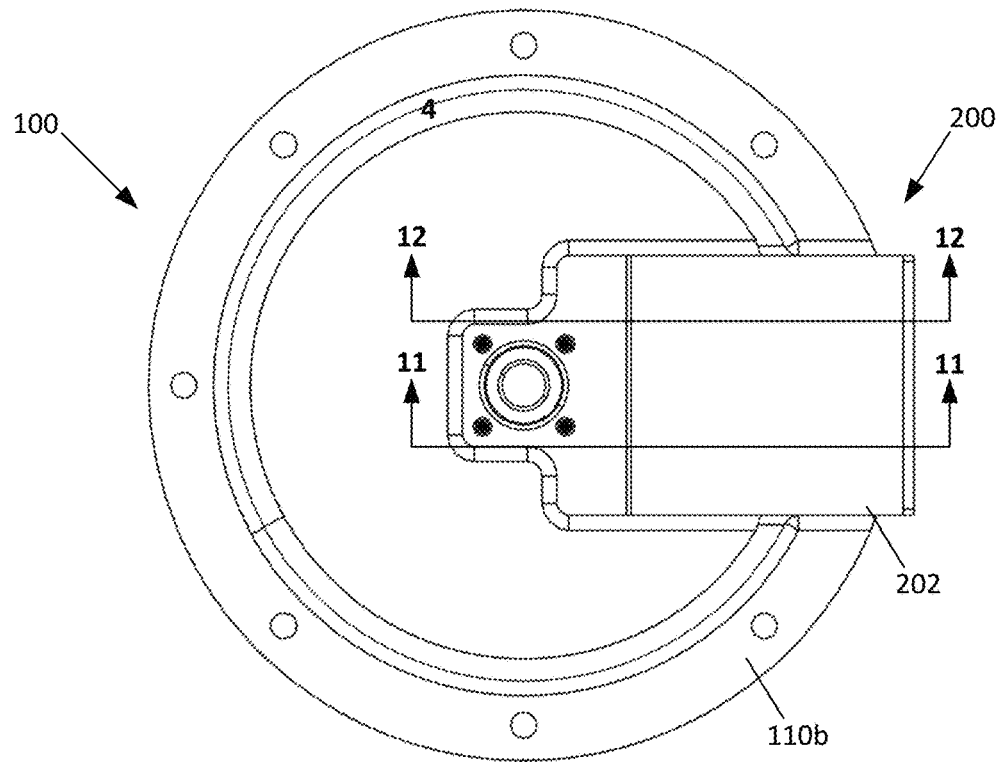
FIG. 5 is a top view of a cover assembly of the pressure relief valve, the cover assembly including the pair of pilot valves.
Figure 6:
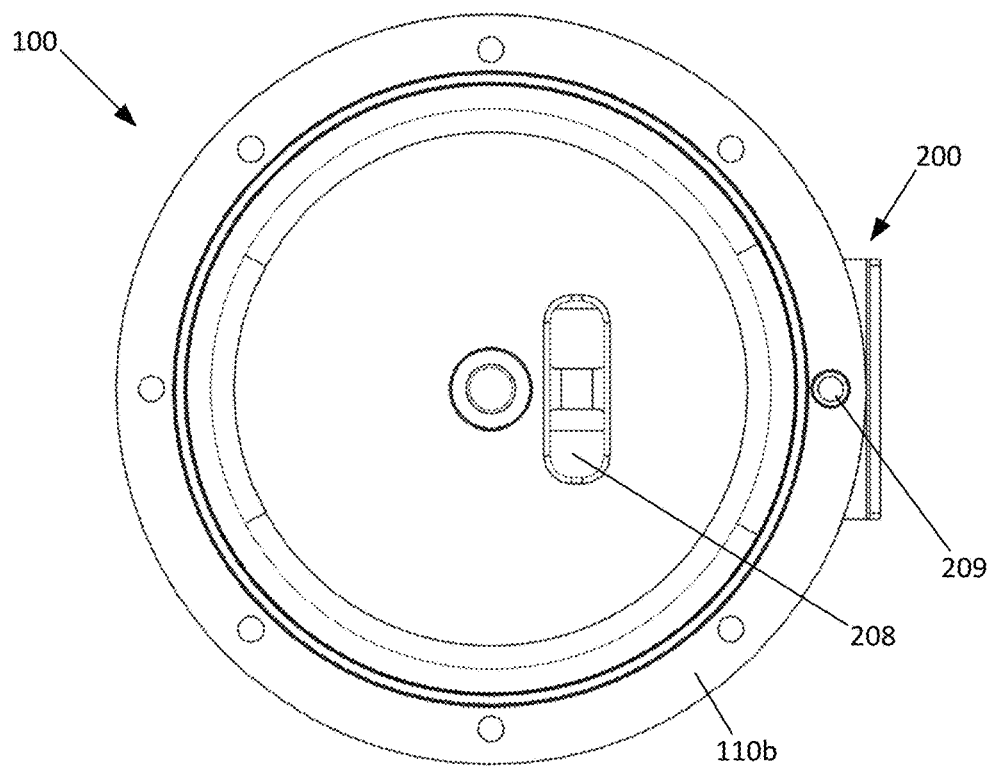
FIG. 6 is a bottom view of the cover assembly shown in FIG. 5.
Figure 7:
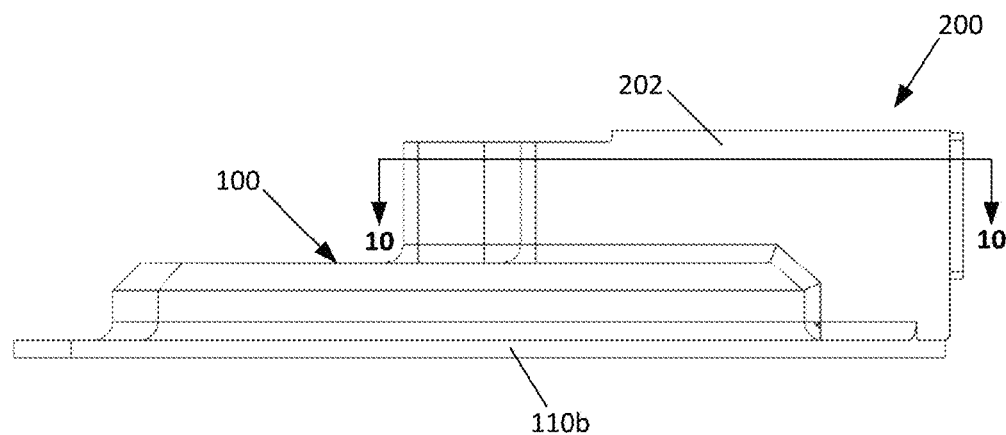
FIG. 7 is a first side view of the cover assembly shown in FIG. 5.
Figure 8:
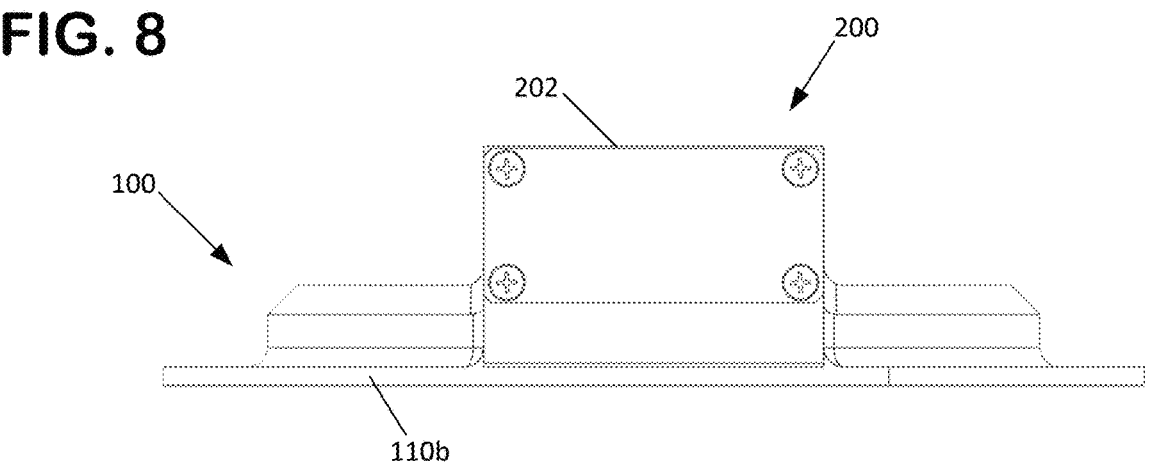
FIG. 8 is a second side view of the cover assembly shown in FIG. 5.

Referring to FIGS. 2 to 4, sectional or cutaway views are shown of an example PRV 100 usable in the system shown at FIG. 1. In general, the aforementioned valve 102 and atmospheric pressure port 104 are supported by a housing or frame 110. In one aspect, the housing 110 includes an open frame structure 110a and structurally supports the valve 102 and includes a channel or passageway 104a extending from the port 104. The housing 110 further includes a cover portion 110b mounted to the frame structure 110a. The PRV 100 further includes a diaphragm 106 disposed between the frame structure 110a and the cover portion 110b. The diaphragm 106 divides the housing 100 into an upper diaphragm chamber 106a, exposed to the atmospheric pressure port 104, and a lower diaphragm chamber 106b, exposed to the fuel in the tank 10 and therefore the internal pressure of the tank 10. In the example shown, the diaphragm 106 also includes a relatively small orifice 106c placing the upper and lower diaphragm chambers 106a, 106b in fluid communication with each other. In one aspect, the diaphragm is connected to a latching stem 112 which selectively enables and disables the valve 102 from operating. For example, when the latching stem 112 is in a first position, as is shown in FIGS. 2 to 4, an enlarged latch portion 112a engages against a locking member 114, for example a ball bearing, such that the locking member 114 is received into a recess 116a of a stem portion 116 of the valve 102. Even though a spring 118 biases the stem portion 116, the locking member 114 prevents this action. When the diaphragm 106 moves the stem 112 in either direction, due to either a negative or positive pressure differential between atmospheric and tank pressures, the latch portion 112a moves past the locking member 114, thereby allowing the locking member 114 to move out of the recess 116a such that the valve 102 can operate.

With reference to FIGS. 5 to 12, details of the pilot valve arrangement 200 are presented. In one aspect, the pilot valve arrangement 200 includes a housing 202 within which a first pilot valve 210a and a second pilot valve 210b are disposed. In the example shown, the housing 202 is integrally formed with the cover portion 110b. In one aspect, the housing 202 defines a first chamber 204 housing the first pilot valve 210a and a second chamber 206 housing the second pilot valve 210b. The housing 202 further includes a first port 208 that places the first and second chambers 204, 206 in fluid communication with the upper diaphragm chamber 106a and a second port 209 that places the first and second chambers 204, 206 in fluid communication with the atmospheric port 104. In one aspect, the housing 202 defines an first end chamber 202b within which the port 208 is defined and that is open to both the first and second chambers 204, 206 at a first end, and defines a second end chamber 202c within which the port 209 is defined and that is open to both the first and second chambers 204, 206 at a second opposite end.

In one aspect, the first and second pilot valves 210a, 210b are identical to each other, but are oppositely arranged within their respective chambers 204, 206 such that the first pilot valve 210a only opens when a predetermined positive pressure differential exists between the first and second ports 208, 209 and such that the second pilot valve arranged within the second chamber and configured to open only when a predetermined negative pressure differential exists between the first and second ports 208, 209.

Figure 9:
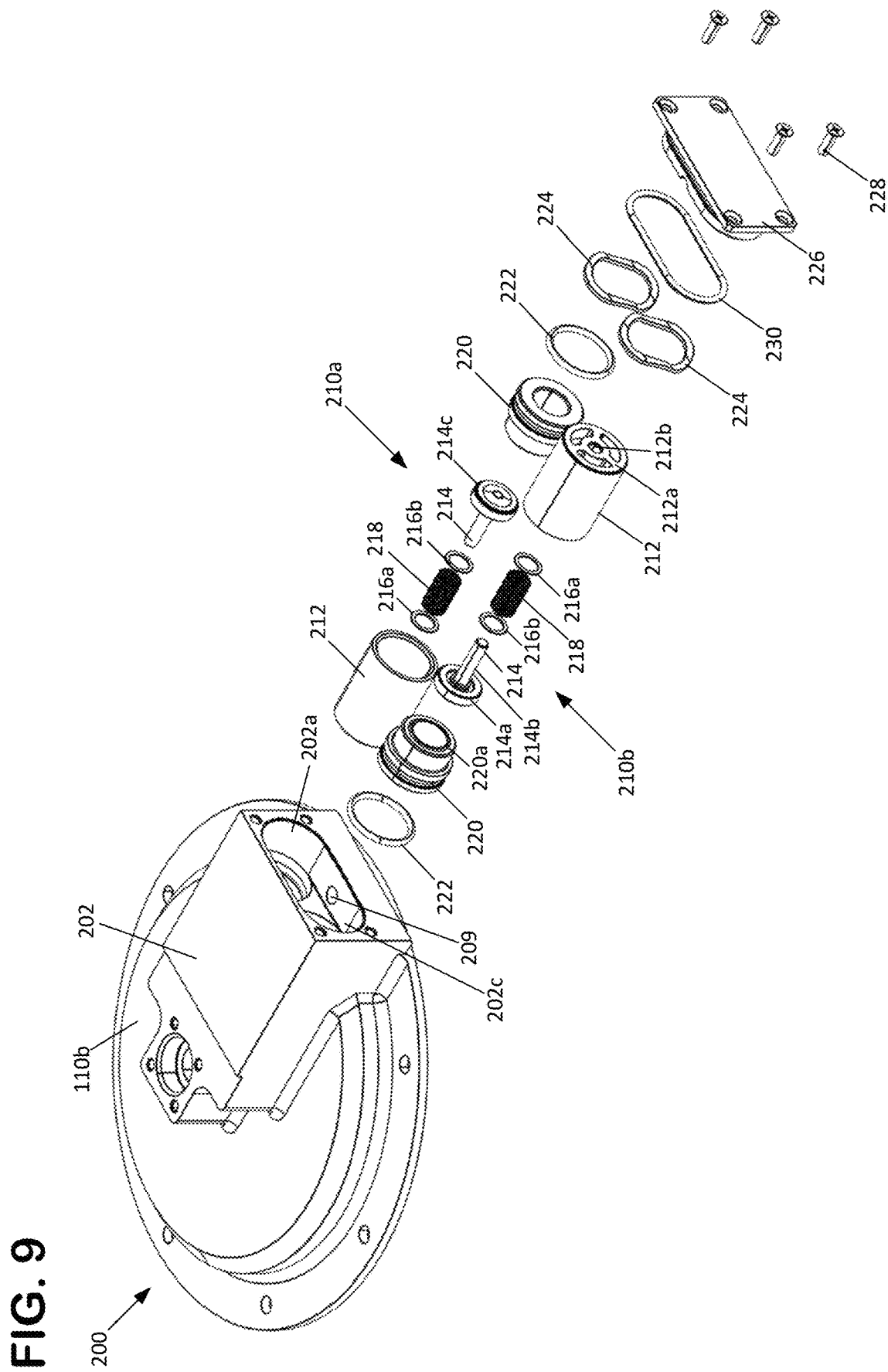
FIG. 9 is an exploded perspective view of the cover assembly shown in FIG. 5.
Figure 10:
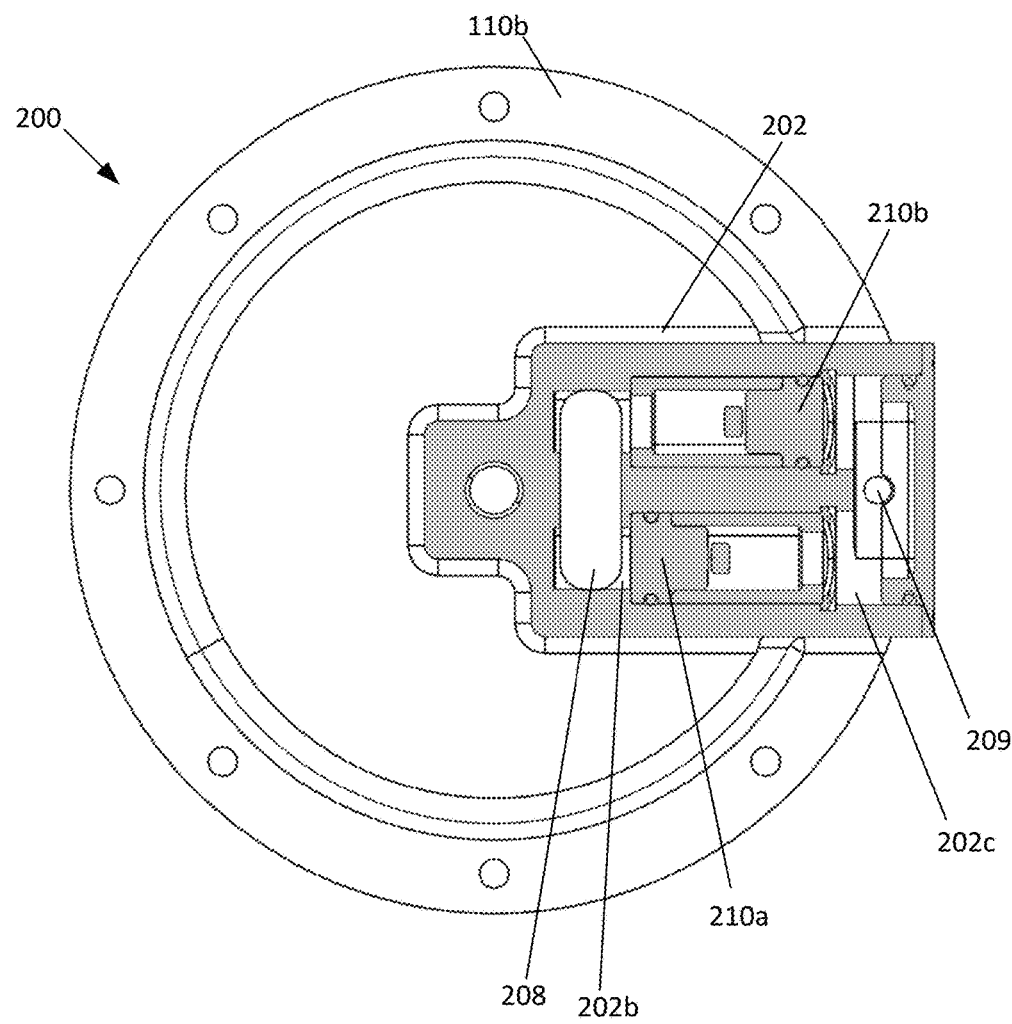
FIG. 10 is a top cross-sectional view of the cover assembly shown in FIG. 5, taken along the line 10-10 in FIG. 7.

As most easily seen at FIG. 9, each of the pilot valves 210a, 210b includes a first housing part 212 that slidably receives poppet part 214 having a head portion 214a and a stem 214b. In one aspect, the first housing part 212 has an end structure 212a defining an opening 212b for guiding the stem 214b. Disposed about the stem 214b are first and second stop rings 216a, 216b between which a spring 218 is disposed. The spring 218 acts between the end structure 212a and the head portion 214a to bias the head portion away from the end structure 212a and towards an end face 220a of a second housing part 220 received by the first housing part 212. The head portion 214a can be provided with a seal member 214c to effectuate a seal with the second housing part 220. When the head portion 214a is sealed against the second housing part 220, the pilot valve 210 is in a closed state wherein fluid flow is prevented from passing through the first and second housing parts 212, 220 and therefore between the ports 208, 209. When sufficient fluid pressure acts on the head portion 214a to overcome the force of the spring 218, the head portion 214a becomes unseated from the end face 220a of the second housing part such that the pilot valve 210 is in an open position wherein fluid flow is allowed to pass through the first and second housing parts 212, 220 and therefore between the ports 208, 209. In one aspect, a seal 222 can be provided about the second housing part 220 such that a seal is formed between the chamber 204/206 and the pilot valve 201a/210b. The assembled pilot valves 210a, 210b can be installed into their respective chambers through an end opening 202a of the housing 202. Once inserted, a disk spring or clip 224 can be inserted into each chamber 204, 206 until it snaps into a recess 202d to positively secure the pilot valves 210a, 210b within the chambers 204, 206. Subsequently, a cover 226 can be installed over the end opening 202a to enclose the housing 202. As shown, fasteners 228 secure the cover 226 to the housing 202. A seal member 230 can be provided such that a seal is formed between the cover 226 and the housing 202.

Figure 11:
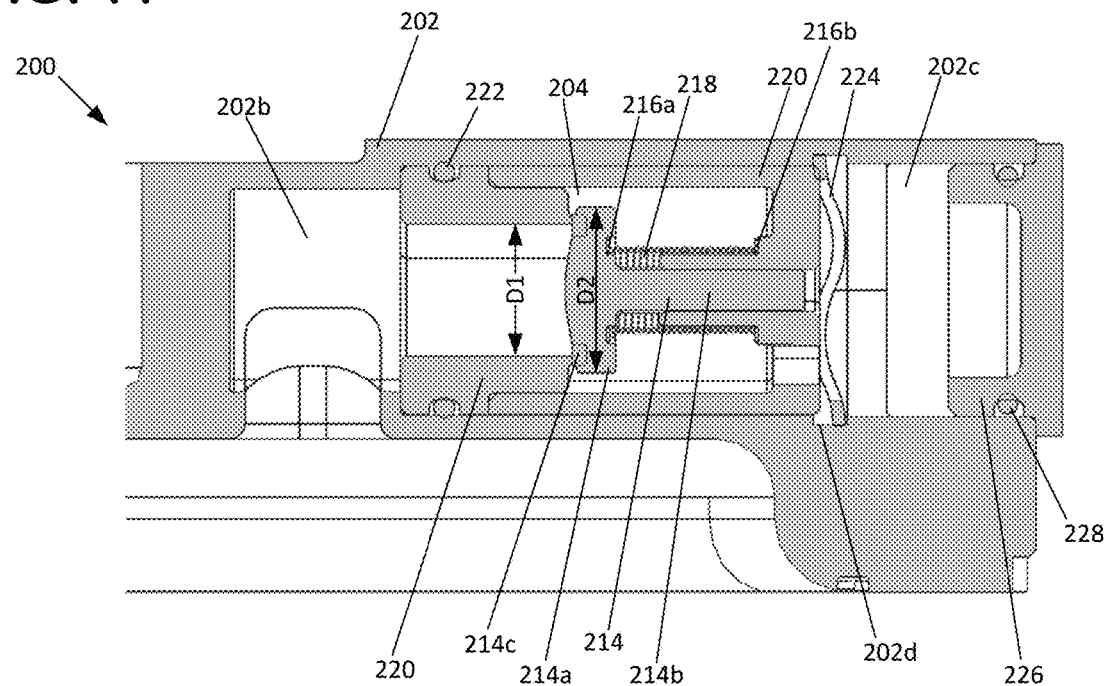
FIG. 11 is a side cross-sectional view of the cover assembly shown in FIG. 5, taken along the line 11-11 in FIG. 5.
Figure 12:
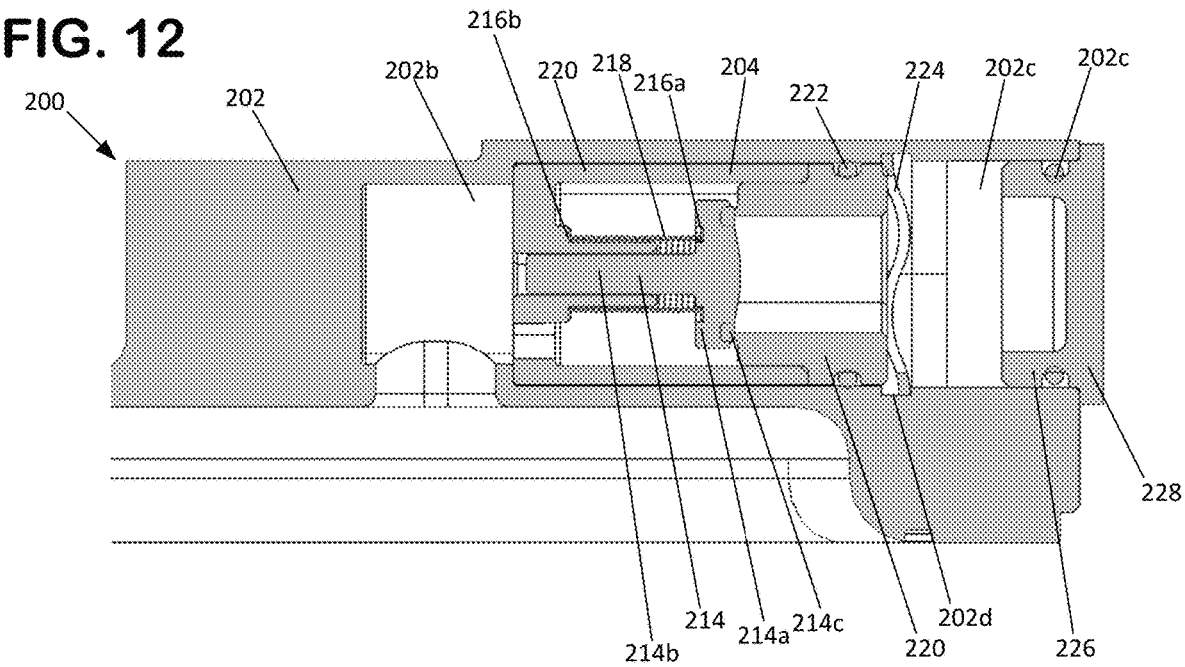
FIG. 12 is a top cross-sectional view of the cover assembly shown in FIG. 5, taken along the line 12-12 in FIG. 5.
Figure 13:
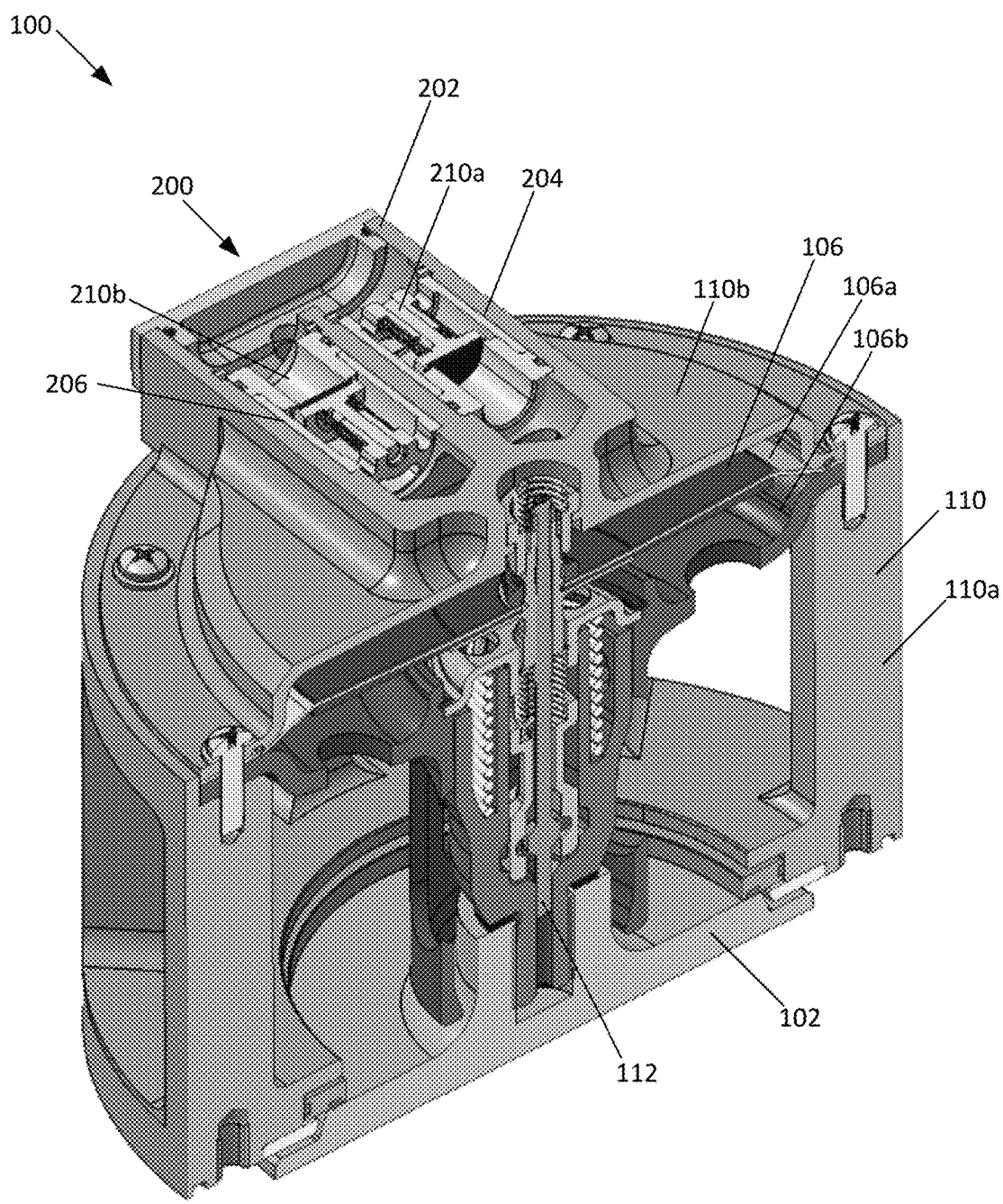
FIG. 13 is a perspective cross-sectional view of a modified version of the pressure relief valve shown at FIG. 2.
Figure 14:
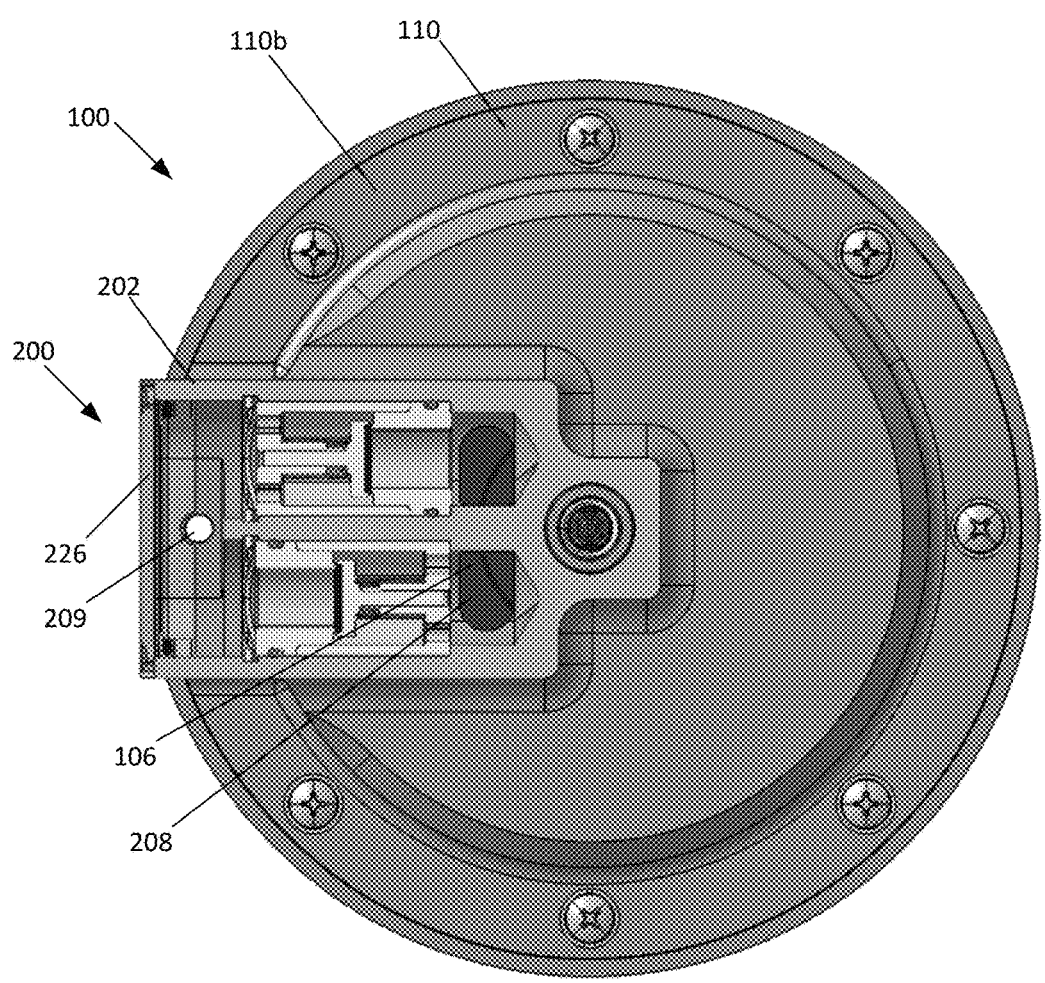
FIG. 14 is a top cross-sectional view of the pressure relief valve shown at FIG. 13.
Figure 15:
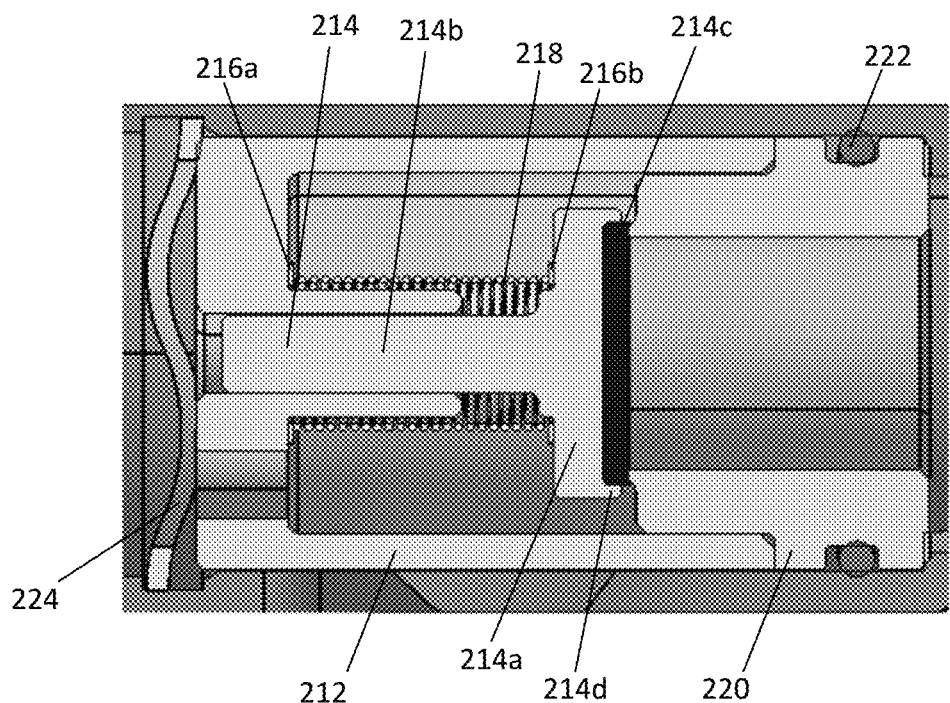
FIG. 15 is a partial side cross-sectional view of the pressure relief valve shown at FIG. 13 showing features of a first pilot valve assembly.
Figure 16:
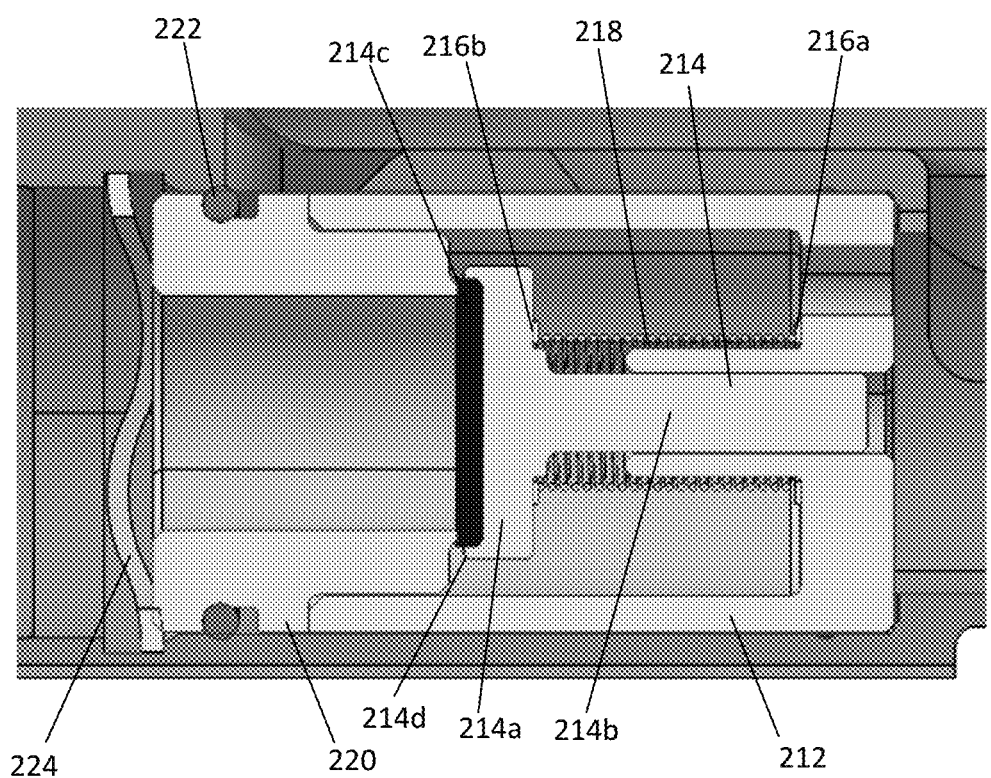
FIG. 16 is a partial side cross-sectional view of the pressure relief valve shown at FIG. 13 showing features of a second pilot valve assembly.

In one aspect, the pilot valves 210a, 210b have been designed such that the surface area of the head portion 214a exposed to fluid is greater when the head portion 214a is open as compared to when the head portion 214a is seated. As illustrated at FIG. 11, the area of the head portion 214a exposed to fluid pressure when the head portion is in the closed position is defined by the internal diameter D1 of the second housing part 220. Once the head portion 214a is displaced away from the second housing part 220, the area of the head portion 214a exposed to fluid pressure is equal to the entire surface are of the head portion 214a which is a direct function of the diameter D2 of the head portion 214a. As D2 is necessarily greater than D1, once the pilot valve 210 cracks open, the increased area defined by D2 enables the poppet 214 to be held open with a lower pressure differential than the cracking pressure. The open pilot valves 210a, 210b will therefore remain open for a longer period of time and will permit more air flow across them, facilitating creation of pressure differential across the diaphragm 106. While the orifice 106c in the diaphragm 106 is trying to equalize pressure between the upper diaphragm chamber 106a and the lower diaphragm chamber 106b (e.g. tank pressure), holding the valves 210 open for more time will create a pressure differential as the flow area through the valves 210 is larger than the orifice 106c. This pressure differential created across the diaphragm 106 will enable release of the latch mechanism 112, 114, 116a, thus opening the main poppet 120.

Referring to FIGS. 13 to 16, an alternative pilot valve arrangement 200 design is presented which utilizes a modified pilot valve 210. In the example shown, many of the features of the pilot valve arrangement 200 shown at FIGS. 13 to 16 are the same as for that shown at FIGS. 1 to 12. Accordingly, where such similarities exist, the previous description is fully applicable and need not be repeated here. One difference in the design of the pilot valve 210 shown at FIGS. 13 to 16 is that the head portion 214a of the poppet part 214 is provided with a circumferential wall 214d that forms a recess or cavity for receiving a seal member 214c having a surface area matching that of the head portion 214a inside of the circumferential wall 214d. Accordingly, the face of the seal member 214c defines the surface area (i.e. area defined by D1) that is exposed to the fluid from the second chamber 202c. In this arrangement the resulting contact area between the seal member 214c and the head portion 214a of the poppet part 214 is also greatly increased. The shape of the seal member 214c shown at FIGS. 13 to 16 is also simplified relative to the seal member 214c shown in the earlier figures, as a disk is provided rather than a toroid-shaped seal. Also, the circumferential wall 214d and the corresponding recess defined in the head portion 214a are more simply produced in comparison to the O-ring shaped recess provided in the head portion 214a presented in the earlier figures.

Figure 17:
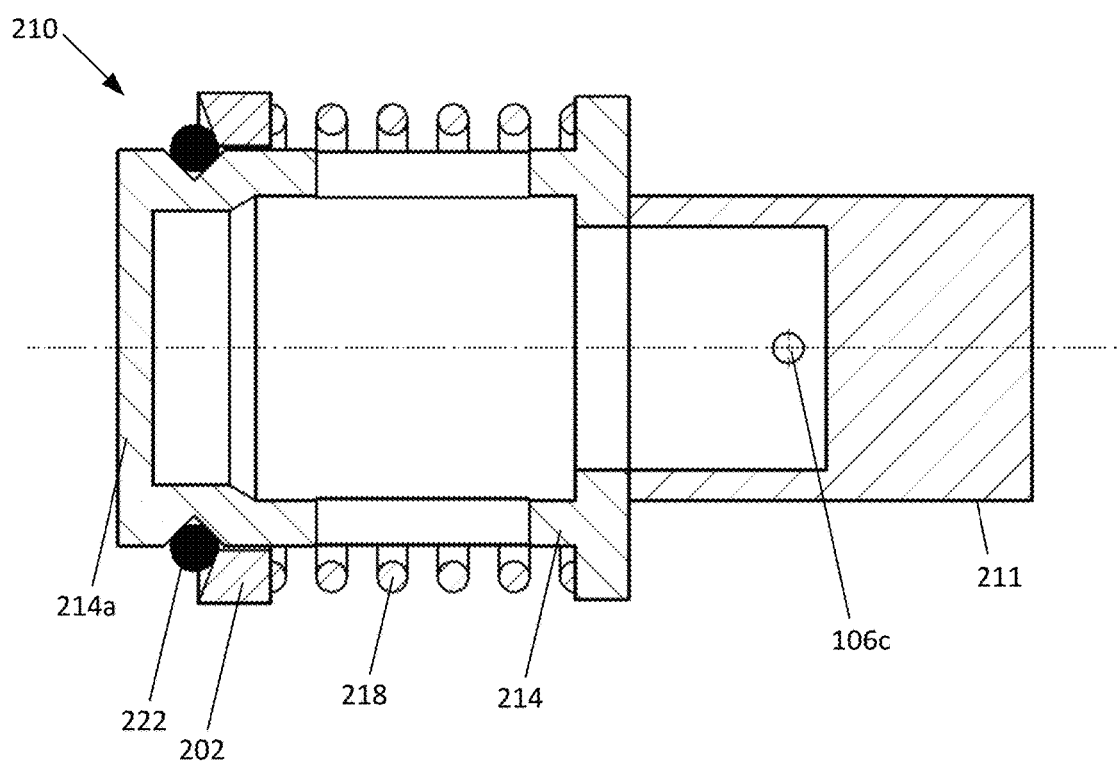
FIG. 17 is a schematic representation of a pilot valve of a two-stage pressure relief valve having features in accordance with the present disclosure.

Referring to FIG. 17, an alternative pilot valve 210 design is presented. In this concept, the orifice 106c to equalize pressure is not located in the diaphragm 106 but is instead located in the vicinity of the pilot valve 210 as seen from FIG. 13. When the pilot valve 210 is closed, the orifice 106c would remain open and would equalize the pressure between the lower diaphragm chamber 106b (i.e. tank side) and the upper diaphragm chamber 106a. With increase in tank pressure with respect to the atmosphere, the pressure differential across the pilot valve 210 will crack it open. The pilot valve 210 is connected to a plug 211 which would travel with the pilot poppet 214 and close the orifice 106c when the pilot valve 210 cracks open. The closure of the pilot valve 210 thus prevents equalization of pressure between the lower diaphragm chamber 106b (i.e. tank) and upper diaphragm chamber. Thus, the air flow across the pilot valve 210 will be able to create a pressure differential across the diaphragm 106. The pressure differential created across the diaphragm 106 will enable release of the latch mechanism 112, 114, 116a, thus opening the main poppet 120.

From the forgoing detailed description, it will be evident that modifications and variations can be made in the aspects of the disclosure without departing from the spirit or scope of the aspects. While the best modes for carrying out the many aspects of the present teachings have been described in detail, those familiar with the art to which these teachings relate will recognize various alternative aspects for practicing the present teachings that are within the scope of the appended claims.

We claim:

1. A pilot valve assembly for operating a pressure relief valve disposed within a fuel tank, the pilot valve assembly comprising:
   a) a housing including a first chamber and a second chamber;
   b) a first port in fluid communication with the first and second chambers, the first port being configured to receive an atmospheric pressure;
   c) a second port in fluid communication with the first and second chambers, the second port being configured to receive a fuel tank pressure;
   d) a first pilot valve arranged within the first chamber and configured to open only when a predetermined positive pressure differential exists between the first and second ports; and
   e) a second pilot valve arranged within the second chamber and configured to open only when a predetermined negative pressure differential exists between the first and second ports;
   f) wherein the pilot valve assembly is coupled to a pressure relief valve, and the first pilot valve is arranged to open only when a predetermined pressure differential exists between an upper diaphragm chamber of the pressure relief valve and atmospheric pressure, wherein when in the open position, the pilot valve assembly blocks an orifice between the upper diaphragm chamber and a lower diaphragm chamber.

2. The pilot valve assembly of claim 1, wherein the first and second pilot valves are oriented in a side-by-side arrangement.

3. The pilot valve assembly of claim 1, wherein the pilot valve housing is integrally formed with a housing of the pressure relief valve.

4. The pilot valve assembly of claim 3, wherein the pilot valve housing is integrally formed with a cover portion of the pressure relief valve.

5. The pilot valve assembly of claim 1, wherein the first pilot valve moves from a closed position to the open position in a first axial direction and wherein the second pilot valve moves from a closed position to the open position in a second axial direction opposite the first axial direction.

6. The pilot valve assembly of claim 1, wherein the first pilot valve and the second pilot valve are each provided with a head portion supporting a seal member and are provided with a spring biasing the seal member against a sealing portion of the housing, wherein the spring and the head portion are located on a common side of the sealing portion of the housing.

7. A valve assembly comprising:
   a) a pressure relief valve including a poppet operated by a diaphragm, the diaphragm defining an upper diaphragm chamber and a lower diaphragm chamber within a housing of the pressure relief valve;
   b) an orifice extending between the upper and lower diaphragm chambers; and
   c) a pilot valve assembly in fluid communication with the upper diaphragm chamber and atmospheric pressure, the pilot valve assembly including:
      i) a first pilot valve, defining a first pilot valve passageway between the upper diaphragm chamber and atmospheric pressure, arranged to open only when a predetermined positive pressure differential exists between the upper diaphragm chamber and atmospheric pressure, wherein when in the open position, the pilot valve assembly blocks the orifice;
      ii) a second pilot valve, defining a second pilot valve passageway between the upper diaphragm chamber and atmospheric pressure, the second pilot valve passageway being separate from the first pilot valve passageway, the second pilot valve being arranged to open only when a predetermined negative pressure differential exists between the upper diaphragm chamber and atmospheric pressure.

8. The valve assembly of claim 7, wherein the first pilot valve and the second pilot valve are each provided with a head portion supporting a seal member and are provided with a spring biasing the seal member against a portion of a pilot valve housing within which the first and second pilot valves are disposed.

9. The valve assembly of claim 7, wherein the first and second pilot valves are oriented in a side-by-side arrangement.

10. The valve assembly of claim 7, wherein the first and second pilot valves are disposed in a pilot valve housing.

11. The valve assembly of claim 10, wherein the pilot valve housing is integrally formed with the housing of the pressure relief valve.

12. The valve assembly of claim 11, wherein the pilot valve housing is integrally formed with a cover portion of the pressure relief valve.

13. The valve assembly of claim 7, wherein the first pilot valve moves from a closed position to the open position in a first axial direction and wherein the second pilot valve moves from a closed position to the open position in a second axial direction opposite the first axial direction.

14. A valve assembly comprising:
a) a pressure relief valve including a poppet operated by a diaphragm, the diaphragm defining an upper diaphragm chamber and a lower diaphragm chamber within a housing of the pressure relief valve;
b) an orifice extending between the upper and lower diaphragm chambers; and
c) a pilot valve assembly in fluid communication with the upper diaphragm chamber and atmospheric pressure, the pilot valve assembly including a first pilot valve arranged to open only when a predetermined pressure differential exists between the upper diaphragm chamber and atmospheric pressure, wherein when in the open position, the pilot valve assembly blocks the orifice.

15. The valve assembly of claim 14, wherein the predetermined pressure differential is a positive pressure differential.

16. The valve assembly of claim 14, wherein the first pilot valve includes a head portion supporting a seal member and a spring biasing the seal member against a portion of a pilot valve housing within which the first pilot valve is disposed.

17. The valve assembly of claim 14, wherein the pilot valve assembly includes a plug portion connected to the first pilot valve and wherein the plug portion blocks the orifice when the first pilot valve is in the open position.

18. The valve assembly of claim 14, further comprising a second pilot valve arranged to open only when a predetermined negative pressure differential exists between the upper diaphragm chamber and atmospheric pressure.

19. The valve assembly of claim 18, wherein the first and second pilot valves are oriented in a side-by-side arrangement, wherein the first pilot valve moves from a closed position to the open position in a first axial direction and wherein the second pilot valve moves from a closed position to the open position in a second axial direction opposite the first axial direction.

* * * * *